United States Patent Office 2,975,577
Patented Mar. 21, 1961

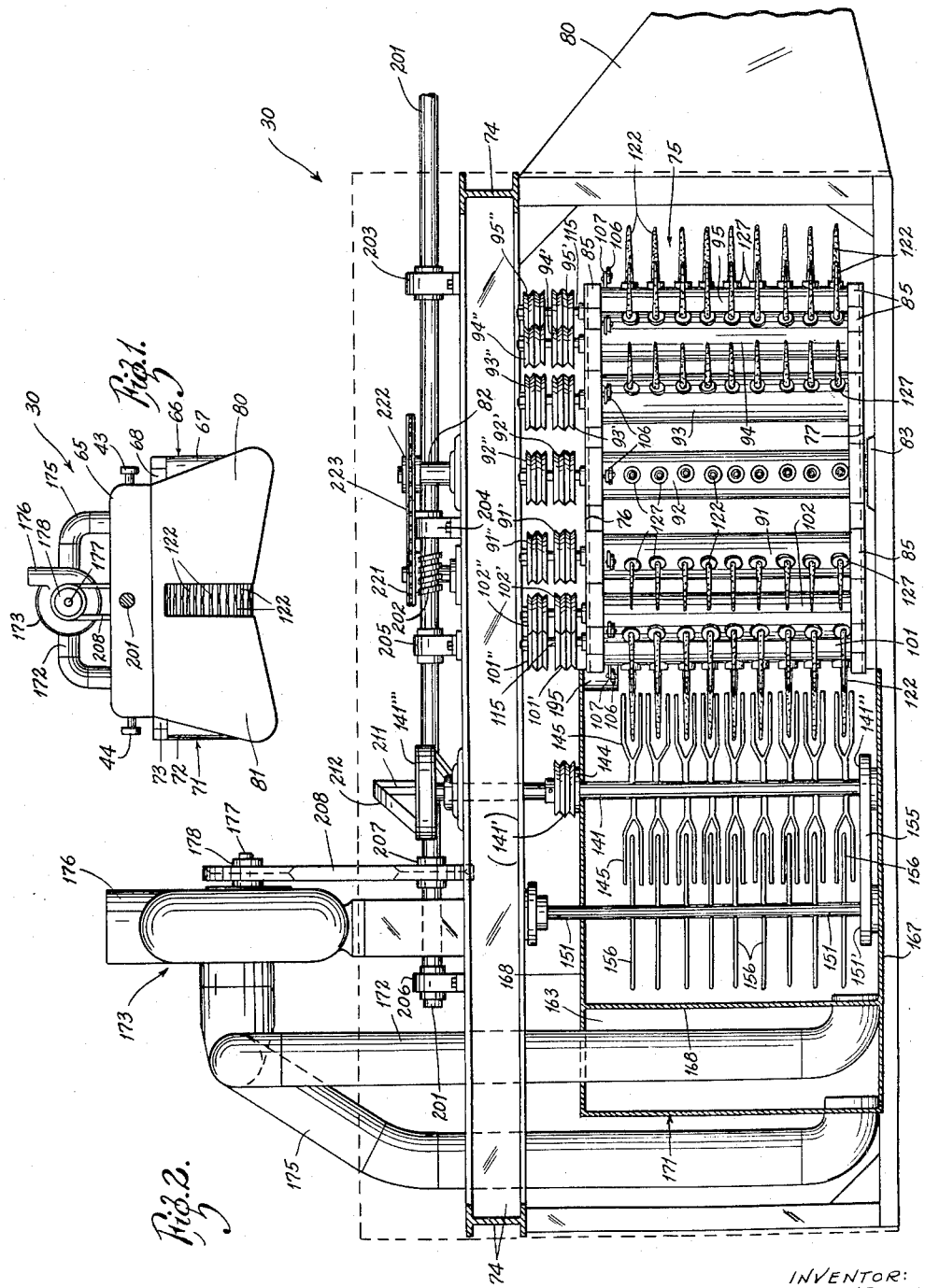

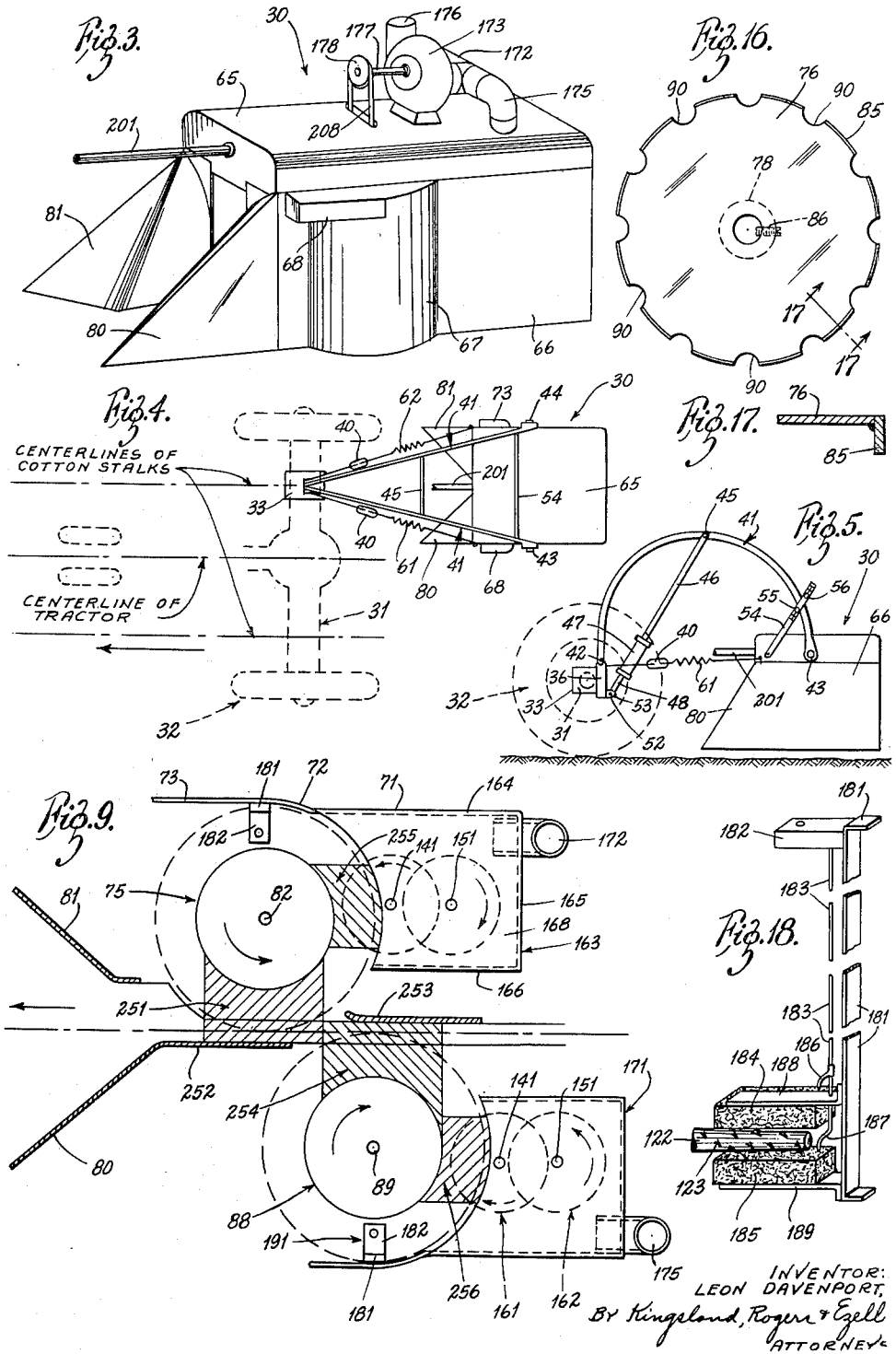

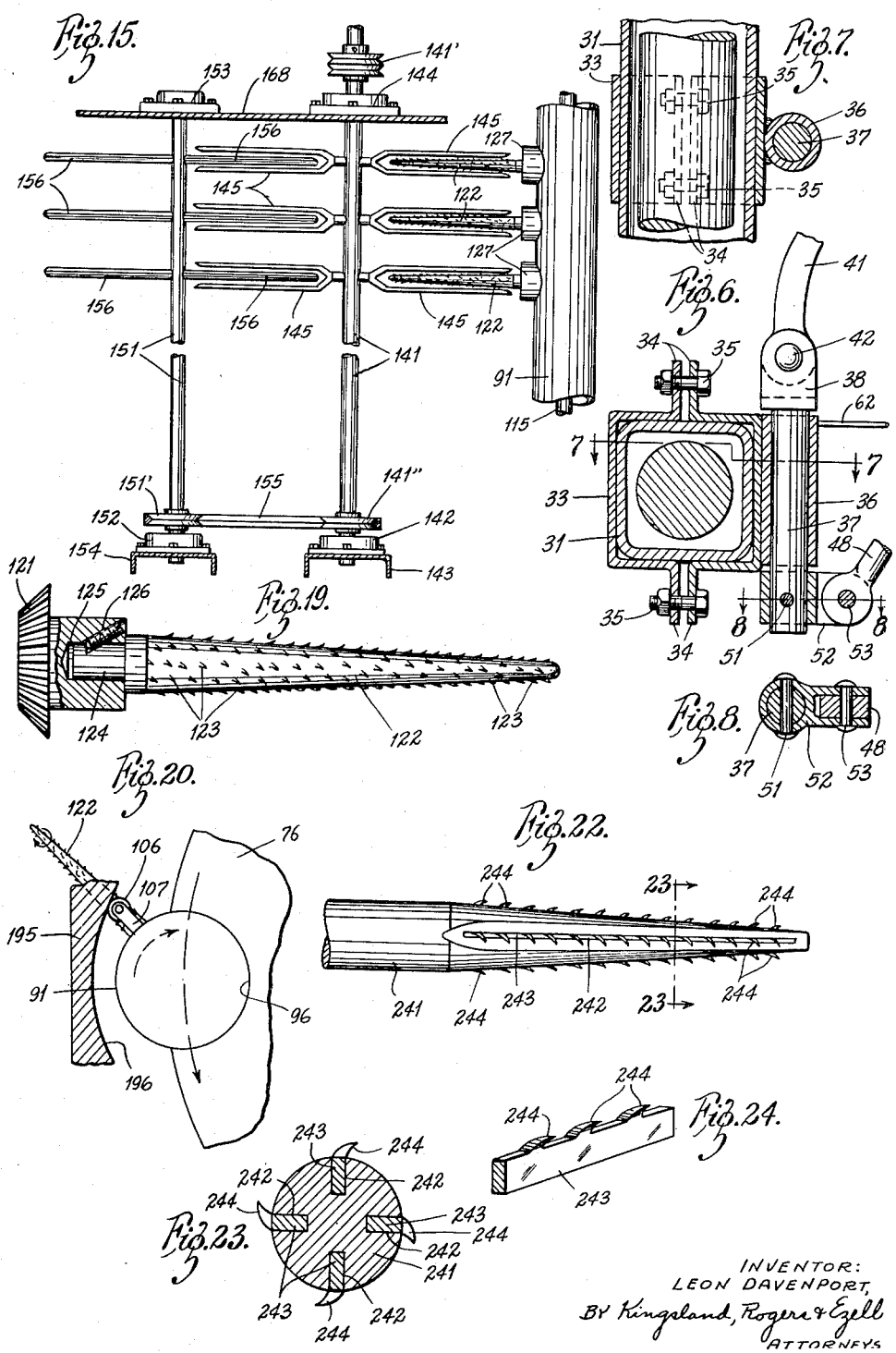

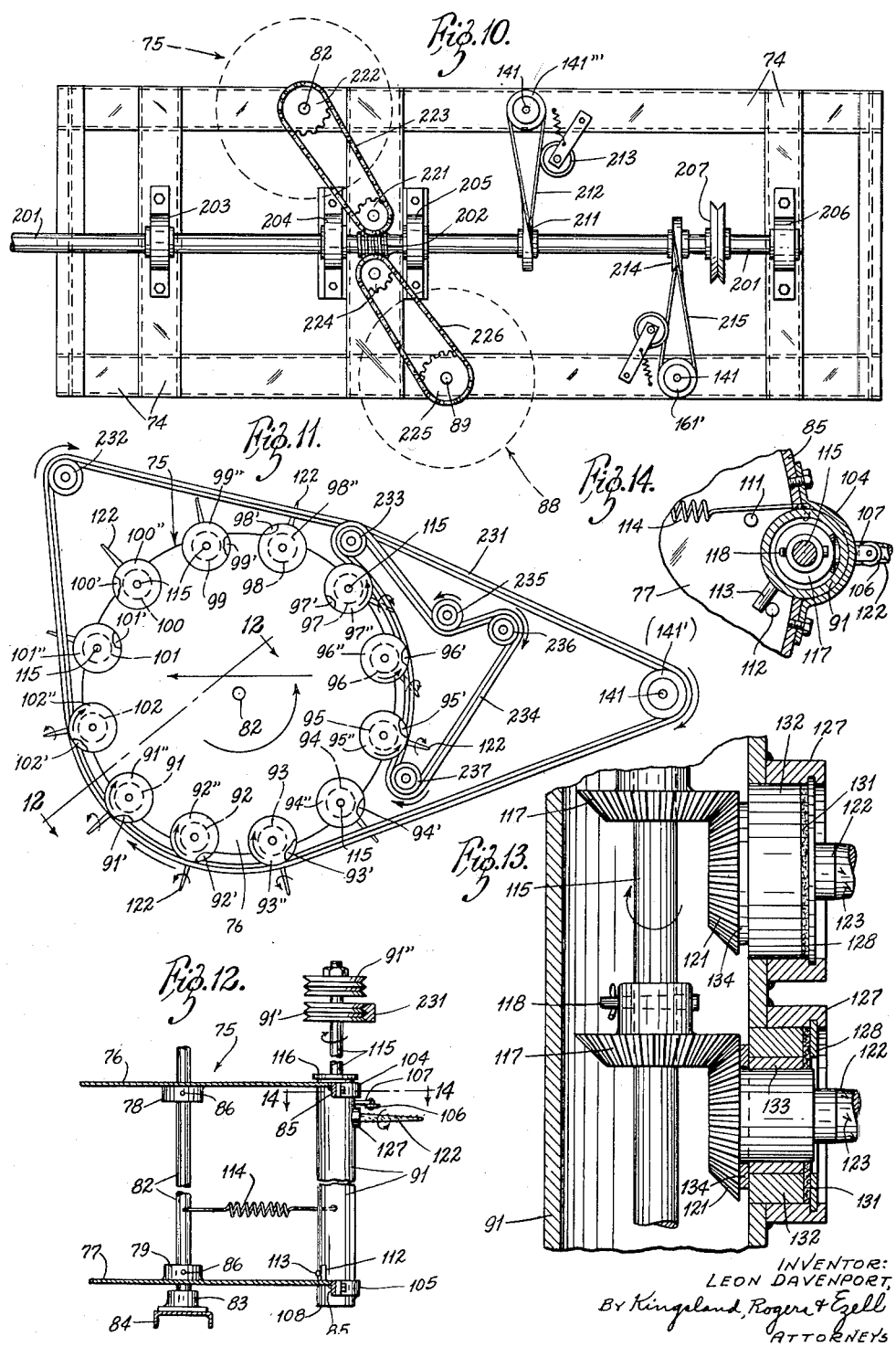

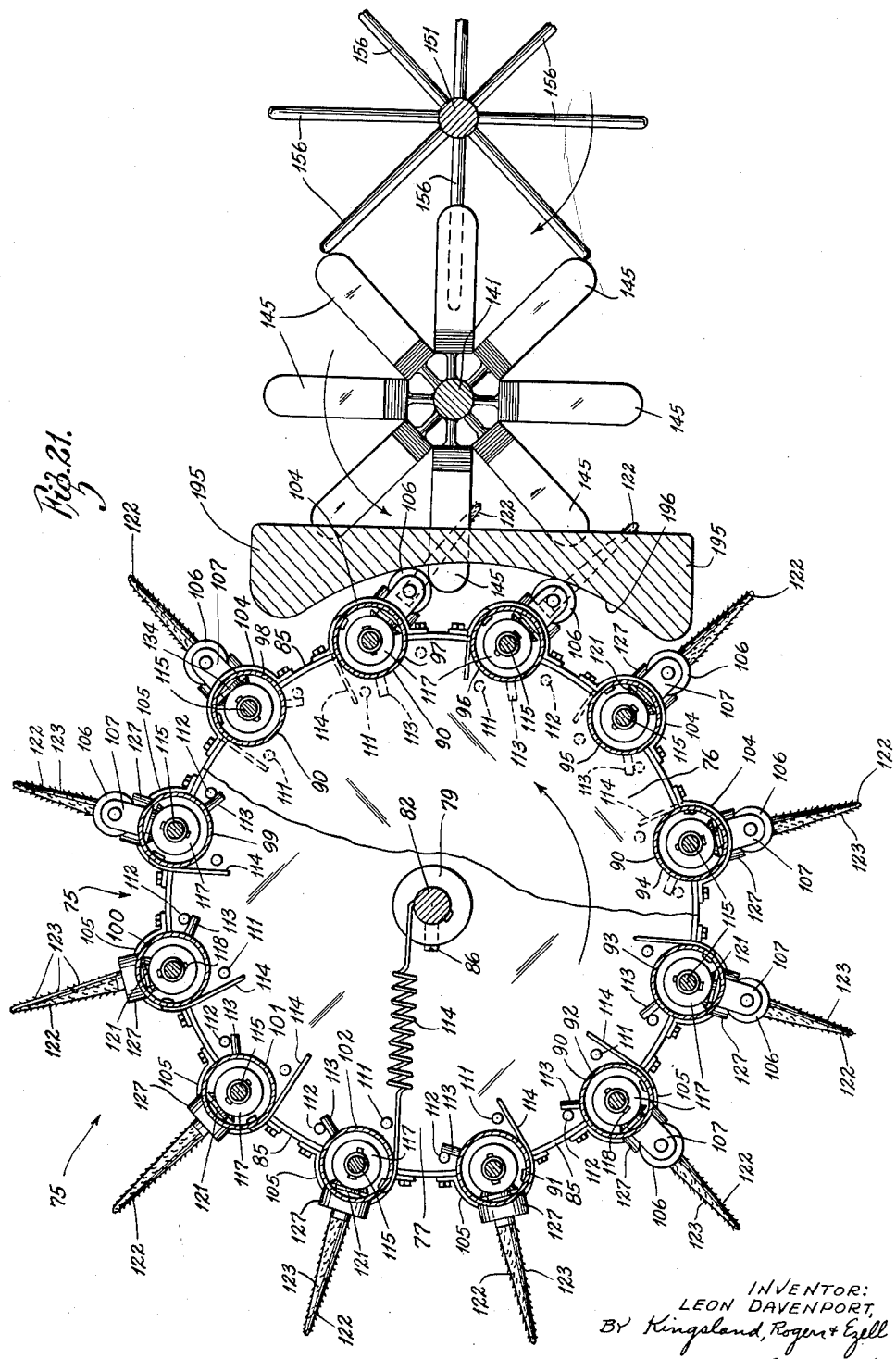

2,975,577

COTTON PICKING UNIT WITH SUSPENSION MEANS

Leon Davenport, Leland, Miss., assignor of four-tenths to Southern Developers, Inc., Memphis, Tenn., a corporation of Tennessee Filed Oct. 15, 1958, Ser. No. 768,522

6 Claims. (Cl. 56—14)

This invention relates to improvements in cotton harvesting machines, and in particular is concerned with a light weight, efficiently operating cotton harvesting machine which is adapted to be used with conventional tractors. To be specific, this harvesting machine is concerned with a harvesting machine which is adapted to be supported from the tractor and in which all of the driving parts may be supplied by the power take-off from the tractor with a very efficient utilization of power by the harvesting machine.

There have been many types of harvesting machines devised in the past, but, in general, these types of machines are heavy, cumbersome and require a substantial amount of power for operation to efficiently effect the cotton picking operation. Such machines have been expensive, difficult to operate and economically practical only for the operation of picking operations in large cotton plantations and the like. By means of the present invention, there has been devised a light weight, economical cotton harvesting machine or cotton picker which can be used with a conventional type of tractor supplied with a power take-off in a very efficient operation.

The harvesting machine of this invention has two picker drums provided with radial spindles which are adapted to be rotated in one direction in the picking operation and in the reverse direction in the cotton lint removal step. The power is supplied from a single source and very efficiently utilized so that the spindles are rotated only during the time they are actually in use, or for a portion of the revolution of the drum.

The actuation of the spindles has been so provided in this invention that they are adapted to be engaged by two-prong wipers in such a manner that the cotton is effectively removed from the spindles in a wiping action. This has been made possible by this invention through the provision of cam actuating mechanisms which cause the spindles to be moved laterally from their radial position in the cotton removal stage toward a tangential position. This effects a very efficient removal of said cotton when taken in conjunction with the reversal of the direction of rotation of the spindles.

In order to provide for efficient adaptation of this machine to conventional types of tractors or other prime movers, a cantilever suspension system has been provided which connects the machine to the rear axle housing of the tractor. This suspension system also has a horizontal stabilizer to keep the machine in a level horizontal relationship and, in addition, lateral alignment means to keep the machine in the proper orientation and direction. With these devices, the machine, which is light in weight and simple to operate, can be conveniently used with any type of tractor or other moving device.

Accordingly, it is an object of this invention to provide a light weight cotton harvesting machine which can be used and supported from a conventional tractor provided with a power take-off.

It is a further object of this invention to provide a light weight cotton harvesting machine which can be suspended from the rear axle housing of a tractor by a cantilever suspension system wherein the harvesting machine is suspended from and entirely removed and out of contact from the ground.

Yet another object of this invention is to provide a light weight cotton harvesting machine adapted to be suspended from the rear axle of a tractor by a cantilever suspension frame having a horizontal stabilizing mechanism and an alignment device to provide for proper orientation of the cotton harvesting machine and to insure that this machine will follow the line of cotton plants automatically.

Still a further object of this invention is to provide a light weight cotton harvesting machine having rotating picking drums provided with spindles which are adapted to extend radially therefrom and rotate in one direction during the picking operation and in a reverse direction during the cotton removing operation, depending upon the rotational position of the drums.

Still a further object of this invention is to provide a cotton harvesting machine having a cotton picking drum provided with spindles in which all of the power is provided by a power take-off, and wherein the spindles are adapted to be rotated in a varying manner, depending upon the rotational position of the drum, and said spindles are idle during a further rotational path of the drum when the spindles are not picking cotton or having cotton removed therefrom.

Yet another object of this invention is to provide a cotton harvesting machine having a cotton picking drum, with the spindles extending therefrom, in which the spindles can be moved from a radial position to a tangential position to effect the wiping of the cotton from the spindles by cotton strippers.

Still another object of this invention is to provide a cotton harvesting machine having cotton picking drums of the reel type in which cotton picking spindles are adapted to be supported on a vertical reel member, and in which the driving parts for the spindle are enclosed within said reel member for protection thereof. The reel member may be rotated through a substantial arc independently of the rotation of the drum to effect a positioning of the spindles from the radial relationship with the drum to a more or less tangential relationship.

It is still another object of this invention to provide a cam actuating mechanism for effecting the shifting of the cotton spindles in the reel member from a radial position to a more or less tangential position, which is brought about by the rotational movement of the entire cotton picking drum.

A further object of this invention is to provide a cotton harvesting machine having more or less opposed cotton picking drums provided with spindles wherein the spindles are adapted to be rotated independently of the drum during a portion of the revolution of the drum in such a manner that a very efficient utilization of power is effected, and no power is wasted on rotating the spindles when they are not in a working stage.

Yet a further object of this invention is to provide a cotton harvesting machine having a cotton picking drum of the reel type with picking spindles supported on the vertical portion of the reel member, and wherein the spindles are adapted to be rotated in one direction in a cotton picking stage and in a reverse direction in a cotton removal stage, and wherein the spindles are adapted to be moved from a radial position to a tangential position, more or less, in the cotton removal stage so that the cotton can be unwound therefrom and wiped off by a stripping device. The stripping device is so arranged with respect to the drum member that, when the spindles are caused to move to their more or less tangential position, the stripping member moves substantially along the axis of the spindle, rather than at right angles thereto to remove the cotton from the barbs on said spindles.

Still a further object of this invention is to provide a cotton harvesting machine which is light weight yet rugged in construction, economical to operate and inexpensive to construct, and which can be made from standard materials of construction.

Yet another object of this invention is to provide a cotton picking spindle which has receiving means for a barb strip so that, when the barbs are dulled, another strip having sharpened bars may be inserted in the spindle in a very simple manner.

Other objects of this invention will appear from the detailed description which follows, and will further be apparent to those skilled in the art.

This invention is illustrated in the accompanying drawings showing a preferred embodiment of this invention for the purpose of example only, and it is to be understood that various modifications and changes therein may be made as will be herein described.

In these drawings:

Figure 1 is a front view in elevation of the cotton harvesting machine;

Figure 2 is an enlarged view in side elevation taken from the left hand of Figure 1 of the cotton harvesting machine with the cover removed from the left side thereon, and wherein the front of the machine appears at the right side of the drawing;

Figure 3 is a perspective view of the cotton harvesting machine taken from the right side of Figure 1;

Figure 4 is a plan view in schematic form showing the cotton harvesting machine adapted to be connected to a conventional tractor;

Figure 5 is a view similar in schematic form to Figure 4, but taken in side elevation from the left side of the machine;

Figure 6 is an enlarged sectional view showing in greater detail the fastening means of the harvesting machine suspension device for attachment to the rear axle housing of the tractor;

Figure 7 is a view in section taken on line 7—7 of Figure 6;

Figure 8 is a view in section showing the harvesting machine attachment on line 8—8 of Figure 6;

Figure 9 is a top plan view of the feeding section of the machine showing in schematic arrangement the right hand and left hand picker drums and the associated lint collection boxes;

Figure 10 is a top plan view of the driving means for the machine, and wherein the front of the machine appears at the left side of the drawing;

Figure 11 is a generally diagrammatic top plan view showing the drive arrangement for the right hand picker drum and spindles with the front of the machine at the left in the drawing;

Figure 12 is a view partly in section taken on the line 12—12 of Figure 11 showing the mounting of one of the spindle assemblies on the right hand drum;

Figure 13 is an enlarged view partially in section showing the spindle drive shaft and mounting of the spindles on the spindle casing;

Figure 14 is a view in section taken on the line 14—14 of Figure 12 showing the spindle casing mounting;

Figure 15 is an enlarged elevation showing the interengagement of the wiper assemblies and spindle and a slightly modified supporting mechanism;

Figure 16 is a top plan view of the top plate of the picker drum;

Figure 17 is an enlarged view in section taken on the line 17—17 of the picker drum plate;

Figure 18 is a perspective view showing a wetting pad device for the picker spindles;

Figure 19 is a view partly in section showing the mounting of the picker spindle;

Figure 20 is a view partly in section showing the operation of the cam to effect lateral movement of the spindle casing and associated spindles for the right hand drum, with the front of the machine at the right hand side of the drawing;

Figure 21 is a view partly in section showing the actuation of the spindles and positioning of the wiper prongs for the right hand picker drum, with the front of the machine at the left hand side of the drawing;

Figure 22 is a plan view of a modified form of picker spindle;

Figure 23 is a view in section taken on the line 23—23 of Figure 22; and

Figure 24 is a perspective view of a barb strip adapted to be used in the spindle of Figure 22.

Referring now to Figures 1, 3, 4 and 5, a cotton harvesting machine is shown generally indicated at 30. It is connected to the rear axle housing 31 of a tractor partially shown in dotted lines at 32.

The connecting and stabilizing means, which are more particularly shown in Figures 6, 7 and 8, include a square frame member 33 having flanges 34 which are adapted to be drawn together by bolts 35 for connection to the tractor axle housing. Secured to the square frame member 33 is a sleeve 36 within which fits a connecting element 37 having a bifurcated portion at its top 38.

A cantilever suspension frame or yoke 41 is secured by a pin 42 to the connecting element 37, and is more fully shown in Figure 5 where it is disclosed as being attached to the harvesting machine 30 at its sides by pins 43 and 44. Connected to the suspension frame by a pin 45 is a rod 46 which is adapted to be extended or contracted by the hydraulic actuating cylinder 47 connected at the other end to a rod 48.

At the bottom of the connecting element 37 connected by a pin 51 is a clevis 52 which is connected to the rod 48 by a clevis pin 53.

Connected to the sides of the cotton harvesting machine, as shown in Figure 5, is a horizontal stabilizer 54 having studs 55 and 56, which are adjustable on the stabilizer and engage between them the suspension frame or yoke 41. The angular relationship of the stabilizer 54 with respect to the right end of the suspension frame 41, as shown in Figure 5, can be varied by adjusting the studs 55 and 56 by threaded engagement (not shown) with the stabilizer 54.

Lateral alignment springs 61 and 62 connect the left and right hand front sides of the harvesting machine to the square frame member 33. These springs are under tension which may be adjusted by turnbuckles 40 to effect proper centering of the harvesting machine and orientation to follow the cotton stalk line.

The cotton harvesting machine is provided with a top cover 65, a left hand cover 66 having a curved portion 67 and a superstructure 68. Similarly, the right hand side cover 71 has a curved portion 72 and a similar superstructure 73. The top cover and side covers are connected to an internal frame 74 which extends along the top, bottom, sides and is used as a brace for the internal cotton picking parts which are to be described.

Connected to the front of the harvesting machine and the frame 74 are left hand cotton stalk guides 80 and right hand guides 81. These guides are adapted to contact the sides of the cotton stalks and guide the plants in a tunnel-like manner to within the interior of the harvesting machine for the cotton picking operation.

The cotton picking drums and their mounting upon the harvesting machine are shown more particularly in Figures 2, 9, 10, 11, 12, 14, 16 and 17. As shown in Figure 2, the right hand drum, which is generally indicated at 75, includes a top plate 76 and a bottom plate 77 mounted at 78 and 79, respectively, upon a drum shaft 82. The shaft 82 is positioned within a bearing cup 83 mounted on a frame member 84 connected to the internal frame 74.

The top mounting plate 76 is shown in full detail in Figure 16, and has a downwardly depending flange 85. The bottom plate 77 is alike in all respects and similarly has a downwardly turned flange 85. A pin 86 in a mounting 78 connects the plate to the shaft 82, and a similar connection is provided for the mounting 79 for the bottom plate 77.

The left hand drum 88 is alike in all respects to the right hand drum 75, and is mounted on an axle 89. It will be noted that both drums 75 and 88 have their top and bottom plates, as particularly shown in Figure 16, provided with semi-circular cut-out portions 90 along the periphery of the plates for a reason to be set out below.

Each of the right hand and left hand drums is provided with a plurality of spindle casings, as shown more particularly in Figures 11, 12, 13 and 14. Figure 11 shows the spindle mounting arrangement for the right hand drum 75 as provided with spindle cases indicated at 91, 92, 93, 94, 95, 96, 97, 98, 99, 100, 101 and 102. The mounting of the spindle casing 91 is shown particularly in Figures 12, 13 and 14, but it is to be understood that the other spindle casings are similarly mounted on both left hand and right hand drums. For the purposes of description only, the spindle arrangement and construction for the right hand drum 75 will be illustrated, since it is to be understood, as will be more particularly described below, the spindle arrangement for the left hand drum is identical and the operation substantially the same in each instance, except in reverse or mirror image relation.

The casing 91 is secured to the top plate 76 by a bracket 104 and to the bottom plate 77 by a bracket 105, as shown in Figures 12 and 14. The brackets are secured to the flanges 85 of the drum plates 76 and 77, respectively, and the upper bracket 104 is further provided with a cam wheel 106 for a reason to appear. The cam wheel is mounted on a wheel support 107 connected to the casing. The lower end of the spindle casing is mounted in a bearing cup 108 which permits a partial rotation of the spindle casing within the plates of the drum between the limits of studs 111 and 112 provided on the bottom drum plate 77. The pin 113, as shown in Figure 14, depending from the casing, normally is in contact with the stud 112 by the biasing action of the spring 114 which is mounted at one side of the spindle casing 91 and at the other end of the spring to the shaft 82.

A spindle power shaft 115 extends through the casing from its top to bottom, and at the top of the casing passes through a bearing plate 116 and is connected to a lower pulley 91' and an upper pulley 91''. The spindle drive shaft 115 has connected to it along its axial length a plurality of beveled spindle drive gears 117 which are pinned to the shaft by gear pins 118.

Each one of the drive gears 117 is associated with a spindle gear 121 which is connected to a tapering spindle 122 provided with pointed barbs 123 which point an oblique angle across the axis of and toward the end of said spindle, as shown in Figure 22. The spindle in its entirety is shown in more particular detail in Figure 19, where it is seen that the reduced diameter end 124 of the spindle shaft is adapted to be positioned within an interior recess 125 of the spindle gear and locked therein by a threaded pin 126.

The spindle gear 121, as shown particularly in Figure 13, is adapted to be mounted in a spindle housing 127. This housing is furnished with an oil seal plate ring 128, a felt oil ring 131, a bushing housing 132, and a bushing 133 which is separated from the head of the drive gear by a spacer 134. The construction of all the spindle casings is similar and each casing has a like number of spindle housings and spindles, which for the purposes of example and illustration of this invention would be nine spindles for each spindle casing. However, the number of spindles on each casing is a matter of choice.

The stripping device used in this invention is best shown in Figures 2 and 15, showing a modification of the supporting mechanism. In Figure 15, a stripper shaft 141 is supported by a bottom bearing cup 142 mounted on a brace 143 connected to the internal frame 74. At its top, the shaft is connected to a top bearing cup 144 and a double sheave pulley 141'. Depending radially from the shaft 141 and axially spaced one from another, all in the same radial line, is a single bank of strippers composed of a plurality of two-pronged stripping elements 145. There are nine of the two-pronged strippers 145 in each bank, and the number of banks arranged circumferentially around the shaft 141 may vary but for the purposes of example may be eight. The two-pronged strippers may be coated on their interior with a rubberoid material so as to protect the barbs of the spindle 122 against injury in the cotton wiping operation which will be later described.

The cotton picking device is likewise shown in Figures 2 and 15 as including a cotton doffing shaft 151 supported in a bottom bearing cup 152 and a top bearing cup 153. The bottom bearing cup 152 is mounted on a base 154 connected to the internal frame 74. The shaft 151 is likewise connected to a bottom pulley 151' adapted to be driven by a pulley belt 155 connected to a driving pulley 141'' fixedly attached to the stripping shaft 141. The cotton doffing shaft 151 is used as a base to support doffing elements 156 which are radially positioned in a single bank axially from the top to the bottom of the shaft, each bank numbering nine doffing elements which are designed to pass between the associated prongs of the stripping elements 145, as shown in Figure 15. The banks of the doffing elements may vary in number, but for the purposes of description there are eight in number circumferentially spaced about the periphery of the shaft 151.

The stripping and doffing devices just described have been for the right hand portion of the machine, and a similar left hand stripping device is indicated generally at 161 with the left hand lifting device being designated at 162, and the integral parts thereof are identical with those described above for the right hand elements.

Both the right hand stripping and doffing devices are positioned within a right hand cotton evacuating or suction chamber designated generally at 163, which is defined by an outside wall 164 formed by a portion of the side 71 of the harvesting machine, an end wall 165 and an interior wall 166. The chamber 163 is further defined by a bottom wall 167 and a top wall 168, on which the bearing cups 153 and 144 are mounted.

The construction of the left hand cotton evacuating chamber, designated generally at 171, is similar in all respects to the right hand chamber. A cotton exhaust conduit 172 leads from the bottom of the right hand chamber 163 to one side of an exhaust blower 173 mounted on the top of the internal frame 74. Similarly, an exhaust conduit 175 leads from the left hand chamber 171 to the same side of the fan. An outlet conduit 176 leads from the outside of the fan and directs the cotton to a desired point. The fan is provided with a drive shaft 177 having a drive pulley 178 at the end thereof to provide for driving force.

A device for moistening the picking spindles 122 is shown in Figure 18 mounted on a supporting bracket 181, as shown in Figure 9 where said bracket is mounted on the side wall 72 of the harvesting machine. Supported on the bracket is a water reservoir 182 connected to a small capillary tube 183 leading to a pair of moistening pads 184 and 185. Branch tubes 186 and 187, respectively, provide moistening of these pads which are secured by connecting plates 188 and 189, respectively, to the bracket 181. There are nine pairs of such moistening pads supported on the bracket 181 so as to provide for adequate moistening of the picking spindles just immediately prior to their being used in picking operations, as appears in Figure 9. The left hand moistening device is indicated generally at 191 and is similar in all respects to the right hand apparatus.

A spindle positioning cam generally indicated at 195 is shown in Figures 2, 20 and 21. This cam has a cam surface 196, which, as shown in Figures 20 and 21, engages the roller 106 of the spindle casing when the spindle is moved opposite said cam by the rotation of the drum. Figures 20 and 21 both show the cam 195 for the right hand drum, but it is to be understood that the left hand cam is identical in operation except, of course, that the direction is reversed for the rotation of the spindle casing and the respective drum. In Figure 21, the striking of the cam surface by the roller 106 has caused the spindle casing to move in a clockwise direction so that the pin 113 moves out of contact with the stud 112 against the biasing force of the spring 114 toward the stud 111.

The driving force for the power actuation of the cotton harvesting machine of this invention is supplied by a conventional power take-off from the tractor through a main power shaft 201, as best shown in Figures 2, 3, 10 and 11. This shaft is provided with a worm gear portion 202, and is supported by a plurality of pillow block bearings 203, 204, 205 and 206 mounted on transverse portions of the frame 74.

A pulley 207, as shown in Figure 10, is fixed to the drive shaft 201 and is adapted to be connected to a pulley belt 208 to provide power to the fan drive shaft 177.

Another pulley 211 is connected intermediately of the main drive shaft, and by means of a pulley belt 212 provides power to the stripper shaft pulley 141'. An idler pulley 213 bears against the pulley belt 212 to take up slack. A similar pulley 214 for providing power to the left hand stripping device is provided, which drives the pulley belt 215 connected to the pulley 161', which is similarly fixed to the stripping drive shaft 141 for the left hand stripper. This pulley is shown in Figure 10 but is omitted from Figure 2 for purposes of clarity and simplicity.

Power is supplied to the right hand drum 75, as shown in Figure 10, through the worm gear 202, the sprocket gears 221, 222 and sprocket chain 223 to drive the drum shaft 82. Similarly, power to the left hand drum 88 is supplied through sprocket gears 224, 225 and sprocket chain 226 to drive the drum shaft 89. All of the aforementioned gears associated with both the left hand and right hand drums are mounted on the frame 74.

The drive arrangement for rotating the spindles and reversing the rotation thereof is best shown in Figures 2 and 11, 12 and 15. A main double sheave pulley 141', as previously described, is connected to the stripping shaft 141 which receives power from the main drive shaft 201, as previously described. A pulley belt 231 connects said pulley 141' with an idler pulley 232 which is housed within the superstructure of the right hand side cover plate of the harvesting machine, and an intermediate twin pulley 233 which for drive belt 231 acts as an idler pulley in the bottom half of this twin pulley. The pulley belt 231 then contacts pulleys 102' 91', 92' and 93', respectively, to effect a clockwise rotation of the drive shafts to which these pulleys are connected. This is particularly shown in Figure 12 where the bottom pulley 91' causes the shaft 115, shown in Figure 13, to rotate in a clockwise direction to move the spindles 122 in a counterclockwise direction.

It will be noted at this time that the pulley belt 231 contacts only the aforementioned pulleys associated with the spindle drive shafts in the spindle casing so that the major portion of the spindle drive shafts are not caused to be rotated in any manner by this pulley belt, as appears in Figure 11. Thus, none of the pulleys 94', 95', 96', 97', 98', 99', 100' and 101' are affected in this particular rotational stage of the drum 75 by said pulley belt.

A reversing drive pulley belt 234 is adapted to be driven by the top half of the twin pulley 233 so that this pulley passes around other pulleys 235, 236 and 237 in the direction indicated in Figure 11. This reversing pulley belt will then contact and drive the top pulleys on the respective drive shafts of spindle casings 95, 96 and 97, as indicated for the top pulleys 95'', 96'', and 97'', to cause a reverse rotation of the spindle shafts and thereby a similar reverse rotation of the picking spindles as compared to the spindles and spindle casing 102, 91, 92 and 93 just previously mentioned.

A modified form of spindle is shown in Figures 22, 23 and 24. As appears therein, a spindle shaft 241 is provided with a plurality of axial slots 242 extending in an axial direction and spaced about the periphery of the spindle. In these slots are positioned strips of metal 243 having pointed barbs 244 thereon. These strips may be conveniently secured within the slots by staking over a portion of the strip or by any other conventional securing means.

The spindle shown in Figures 22 to 24 is of particular advantage since, when the barbs are dulled, a new strip can be readily inserted therein, and the strips are expendable should any of the barbs be broken. This spindle obviates a disadvantage long felt in the field since sharpening of the barbs on the spindle was an almost impossible task. Further, the spindle bases need not be removed from the machine when inserting the strips, which reduces greatly the so-called down time.

*Operation*

The cotton harvesting machine of this invention is designed to be used with any conventional tractor or other motivating device, such as a jeep, etc. As shown in Figures 4, 5, 6 and 7, the square frame 22 is adapted to be fastened to the axle housing. The square frame and the connection 36 welded thereto are then securely fastened by means of the flange 34 and bolts 35. This connection is made as shown in Figure 4 at the right side of the axle housing, although it is to be understood that it could also be made at the left side, and where desired two such machines might be used side by side to simultaneously harvest two furrows.

The harvesting machine 30 in use is suspended as shown in Figure 5 a slight distance from the ground, and this elevation is effected by the extension or contraction of the rod 46 in the hydraulic cylinder 47. This allows the cantilever suspension frame 41 to move either upwardly or downwardly at its free end through rotation about the pin 42 and the bifurcated yoke 38 of the connection 36. When the proper vertical adjustment has been made, the machine 30 is horizontally stabilized by means of the stabilizer 54 so that the adjustable studs 55 and 56 engage between them the frame 41. This prevents rocking of the harvesting machine and insures a level positioning.

Lateral adjustment of the machine is effected by the springs 61 and 62 leading from the right and left side of the machine to the connection 36, and wherein proper adjustment is effected by the turnbuckles 40 to insure that the machine is pointed along the axis of the tractor and is aligned with the cotton plants.

As the tractor is operated and as it follows the furrows in the field, the cotton harvesting machine will ride freely suspended behind the tractor a short distance from the ground in such a position, as shown in Figure 4, that the center line of the cotton stalks will pass directly between the right and left stalk guides 81 and 80, so that the stalks are fed directly into the interior of the harvesting machine. By means of this freely supported system, together with its stabilizing and lateral alignment mechanisms, the machine is adapted to automatically follow slight irregularities in the line of the plants, since the stalk guides 80 and 81 will follow the cotton plants so that the plants are at all times set in a line into the maw of the machine. This is made possible since the harvesting machine can turn slightly in a lateral direction because of the biasing means 61 and 62 which allow slight give and take in either a right hand or left hand lateral direction with respect to the tractor.

As the harvesting machine advances, cotton plants are fed to the right hand drum, first of all, as appears in Figure 9, and then subsequently to the left hand drum. The direction of travel in the machine of Figure 9 is from right to left, as appears in the direction of travel indicated. The cotton stalks, after being guided into the maw of the machine by stalk guides 79 and 80, pass into the right hand drum picking area indicated generally by the shaded line region indicated at 251. This region is bounded on the right hand side by the picking drum 75 and on the left hand side by the right hand crowder wall 252. As the machine progresses, the cotton stalks are split by the left hand crowder wall 253, and the portion of the cotton stalks which has been picked by the right hand drum passes through the area bounded by the wall 166 and said left hand crowder wall 253. The other portion which represents the left hand half of the cotton plants, and which has not been acted upon by the right hand drum picker, passes into the left hand drum picking area, generally indicated at 254 which is bounded on the right hand side by the wall 253 and on the left hand side by the left hand picking drum 88. This portion of the cotton as the machine progresses over it is then passed through the area defined by the wall 253 and the inside wall of the chamber 71 as it leaves the machine in cleaned condition.

The cotton which has been picked by the rotating spindles of the right hand drum 75 in the region 251 is then carried by the rotation of the drum into the region 255, where it is stripped by the stripping device. The strippers rotate about the shaft 141 which moves in a counterclockwise direction similarly to the counterclockwise rotation of the drum 75. The cotton which has been stripped by the two-pronged strippers 145 of the stripping device is then doffed therefrom by the engagement of the single-prong doffers 156 which are rotated in a clockwise direction by the lifter shaft 151. The clean cotton is then evacuated from the chamber 163 by the vacuum in conduit 172 through the action of the blower 173 and discharged through the conduit 176 into a convenient receptacle or wagon which follows the harvesting machine, as is conventional in the art.

The stripping action for the left hand side of the machine is similar to that just described for the right hand section as it takes place in the stripping region 256. The stripped cotton is then lifted from the stripping device by the single-prong doffers rotated by the shaft 162 in the chamber 171, and removed therefrom by the vacuum in the conduit 175 and discharged into the same outlet 176.

The particular operation of the spindles and the drive engagement therefor is best understood by referring to Figure 11 taken in conjunction with Figures 2, 9 and 12. The operation of the right hand drum in the harvesting machine, which advances in the direction of the arrow indicated from right to left, is shown in Figure 11, and it is to be seen, as mentioned previously, that the drum rotates about the shaft 82 in a counterclockwise direction. At the same time, the pulley belt 231 is driven by the pulley 141' in a clockwise direction, and it is the operation of this pulley that effects the counterclockwise rotation of the individual spindles in each spindle casing.

Since the power for the spindle drive shafts, as shown in Figure 13 for the drive shaft 115, can be supplied only by the upper and lower pulleys which for the spindle casing 91 are, as shown in Figure 12, 91" or 91', respectively, it is obvious that, when neither of these pulleys is driven by a pulley belt, there will be no rotation of the individual spindles on that particular spindle casing. Thus, as appears in Figure 11, the spindles for the spindle casings 98, 99, 100, 101 and 94 are all stationary in this particular rotational position of the drum 75. However, for the spindles 102, 91, 92 and 93, the lower pulleys, which for each case will be respectively 102', 91', 92', and 93', will be driven in a clockwise direction by the main drive pulley belt 231. This will impart a similar clockwise direction to the shafts on which these pulleys are mounted in the spindle casings, and as appears in Figure 13 this clockwise direction will cause a counterclockwise direction of the spindles 122.

However, in the case of the spindle casings 95, 96 and 97, it will be seen that, although these spindles have their pulleys out of contact with the main drive belt, their upper pulleys 95", 96" and 97" are driven by the reversing pulley belt 234. This pulley is driven in a clockwise direction by the top half of the twin pulley 233, which is in turn driven in a clockwise direction by the engagement of its bottom half with the main pulley drive belt 231. By referring to said Figure 11, it will be seen that this reversing drive pulley belt 234 will cause the upper pulleys in the spindle casings just mentioned to rotate in a counterclockwise direction so as to reverse the rotation of the spindles associated with the respective spindle casings to a clockwise direction.

It will now be seen that, by referring back to the spindle casings 102, 91, 92 and 93, the counterclockwise direction of rotation of the spindles 22 is in the same direction as the pointed barbs 123 which are set at an angle to the axis of the spindles. This is seen in more detail by reference to Figure 13, and by means of this particular arrangement the spindles, as they contact the cotton in the region 251 shown in Figure 9, grasp the cotton fibers in a much more secure manner so as to clean the cotton fibers from the cotton plants in a very efficient manner. By this means and the particular rotation of the spindles, the cotton fibers are caused to be more or less wound on the spindles. Then, as the cotton on these spindles is transferred from region 251 to the stripping region 255 for the right hand drum by the rotation of the drum, the reverse rotation just described for the spindles in said stripping region makes the stripping action much more efficient, since these fibers are more or less unwound and are thereby loosened and stripped much more readily from the spindles.

The stripping action is further enhanced by the lateral shifting of the spindles caused by the engagement of the spindle rollers 106 with the cam 195, as appears in Figures 11, 20 and 21. Thus, it will be seen that for the spindle casing 96 the engagement of its roller with the cam has caused the entire spindle casing to shift in a clockwise direction against the force of the biasing spring 114 in such a manner that the spindle 122 is shifted from a radial position with respect to the drum to a more or less tangential position. This shifting of the position of the spindle can be varied according to the shape, size and extent of the cam surface 196, so that, if desired, the cam may be extended so as to cause the lateral shifting of the spindles 94 and 95 as well, where this is to be sought. For instance, it is contemplated that, if longer spindles are desired to be used, the cam could be extended in such a manner so as to extend into the region 251, which would cause a lateral shifting of the spindles as they pass through this region, and would thereby prevent the longer spindles from knocking against the crowder walls 252 and 253.

As mentioned previously, the engagement of the roller associated with the spindle casing by the cam causes the spindle casing to lag or assume a more or less tangential position, and by means of this positioning the pin 113 in the bottom of the spindle casing, as appears in Figure 14, will be caused to move from stud 112, in which it is in normal engagement by the force of the biasing means, toward the stud 111. This is more fully shown by Figure 21. It will further be noted that this shifting arrangement and the spring biasing of the spindle casing against the stud 112 in all positions of the spindle casing shown in Figure 11, except for the spindles in casings 96 and 97, permits an automatic spindle release should the machine become obstructed or clogged with cotton. Thus, should the region 251 become partially obstructed with cotton, the spindles on spindle casings 102, 91, 92 and 93, which would pass therethrough, would strike this obstruction. The spindle casings would then be caused by the force thereof to move against the biasing spring 114 in a clockwise manner about the spindle drive shafts. This will substantially relieve any force tending to break the spindles by such obstruction or clogging of the machine.

As a further extension of the manner in which the cam can be modified, it should be noted that the cam could be extended to contact the rollers of the spindle casings 98 and 99, as shown in Figure 11, so that, when these spindles pass through the wetting device shown in Figures 9 and 18, they will lag or pass through it in the direction of their axes. As shown in Figure 18, however, the cam has not been so extended, and the spindles 122 pass through the wetting pads at right angles to the axes of the spindles. It will be observed, however, that the direction of the pointed barbs 123 is such that there will be a minimum of resistance to the top pad 184.

The wetting system shown in Figure 18 makes possible the wetting of the spindles prior to their picking the cotton in the region 251, which effectively increases the cotton picking ability of the spindles since the fibers more easily adhere to the spindles when they are wet.

Returning to the stripping operation for the right hand drum in the region 255, it will be seen by referring to Figure 21 that the wiping action of the two-pronged strippers is more or less along the axis of the spindles, so that, when these spindles are rotated and lag in the more or less tangential position shown in this figure, the cotton is unwound from the reversely rotating spindles and is clearly wiped off by the two-pronged strippers. This particular means for stripping the spindles by their shift in position greatly enhances this stripping action to remove all of the cotton wound thereon with a minimum of force. After the cotton has been removed by the two-pronged strippers, it is doffed therefrom by the engagement of the single-prong doffers, as shown in Figure 15, and then evacuated from the chamber 163 as above described. The operation in the left hand picking, stripping, and doffing area is identical with that described for the right hand section, but, as appears in Figure 9, the direction of rotation of the elements is reversed.

By means of this invention, there has been provided a cotton harvesting machine which can be used with conventional tractors and the like as an auxiliary piece of equipment. The harvesting machine is easily supported and is adapted to follow the cotton plants in an automatic manner without any detailed attention being required by the operator. In this operation, a very efficient utilization of power is effected, since the spindles are rotated only during the actual picking or stripping operation, and at all other times are stationary, such that no power is expended thereon. The machine is extremely easy and simple to operate and, since it is made of standard materials of construction in a very rugged manner, the maintenance problems are at a minimum.

Various changes and modifications may be made according to the teaching of this invention, as will be apparent to those skilled in the art. Such changes and modifications are within the scope of this invention as defined by the claims appended hereto.

What is claimed is:

1. A cotton harvesting machine adapted to be suspended from, disposed rearwardly of, and driven by a tractor having a rear axle housing, said machine having cotton picking means, forwardly extending suspension means for suspending said machine at various heights relative to the ground being traversed, said suspension means including an arched rearwardly diverging yoke having laterally spaced rear ends pivotally attached to said machine and a front end adapted to be pivotally attached to said axle housing, and stabilizing means operatively associated with said machine and said rear ends of said yoke for maintaining the machine in a horizontal position, said stabilizer means including a stabilizer on each side of the machine with each stabilizer having one end attached to the machine and the other end being secured to the yoke adjacent one of said laterally spaced ends.

2. A cotton harvesting machine adapted to be suspended from, disposed rearwardly of, and driven by a tractor having a rear axle housing, said machine having cotton picking means, forwardly extending suspension means for suspending said machine at various heights relative to the ground being traversed, said suspension means including an arched rearwardly diverging yoke having laterally spaced rear ends pivotally attached to said machine and a front end adapted to be pivotally attached to said axle housing, adjusting means for varying the height of said rear ends relative to said front end, said adjusting means including an elongated support extending rearwardly and upwardly with the upper end connected to said yoke between the front and rear ends thereof and the lower end adapted to be connected to said axle housing below said front end of said yoke, said adjusting means further including means for varying the length of said support, and stabilizing means operatively associated with said machine and said rear ends of said yoke for maintaining the machine in a horizontal position, said stabilizer means including a stabilizer on each side of the machine with each stabilizer having one end attached to the machine and the other end being secured to the yoke adjacent one of said laterally spaced ends.

3. A cotton harvesting machine adapted to be suspended from, disposed rearwardly of, and driven by a tractor having a rear axle housing, said machine having cotton picking means, forwardly extending suspension means for suspending said machine at various heights relative to the ground being traversed, said suspension means including an arched rearwardly diverging yoke having laterally spaced rear ends pivotally attached to said machine and a front end adapted to be pivotally attached to said axle housing, and stabilizing means operatively associated with said machine and said rear ends of said yoke for maintaining the machine in a horizontal position, said stabilizer means including a stabilizer on each side of the machine with each stabilizer having one end attached to the machine and the other end being secured to the yoke adjacent one of said laterally spaced ends, and yieldable lateral alignment means for maintaining the machine in a properly oriented direction relative to the intended direction of travel of the machine and permitting the machine to shift in response to misaligned stalks, said alignment means having rear ends attached to the sides of the machine and front ends adapted to be connected to said axle housing adjacent the front end of said yoke.

4. A cotton harvesting machine adapted to be suspended from, disposed rearwardly of, and driven by a tractor having a rear axle housing, said machine having cotton picking means, forwardly extending suspension means for suspending said machine at various heights relative to the ground being traversed, said suspension means including an arched rearwardly diverging yoke having laterally spaced rear ends pivotally attached to said machine and a front end adapted to be pivotally attached to said axle housing, adjusting means for varying the height of said rear ends relative to said front end, said adjusting means including an elongated support extending rearwardly and upwardly with the upper end connected to said yoke between the front and rear ends thereof and the lower end adapted to be connected to said axle housing below said front end of said yoke, said adjusting means further including means for varying the length of said support, and stabilizing means operatively associated with said machine and said rear ends of said yoke for maintaining the machine in a horizontal position, said stabilizer means including a stabilizer on each side of the machine with each stabilizer having one end attached to the machine and the other end being secured to the yoke adjacent one of said laterally spaced ends, and yieldable lateral alignment means for maintaining the machine in a properly oriented direction relative to the intended direction of travel of the machine and permitting the machine to shift in response to misaligned stalks, said alignment means having rear ends attached to the sides of the machine and front ends adapted to be connected to said axle housing adjacent the front end of said yoke.

5. A cotton harvesting machine adapted to be suspended from, disposed rearwardly of, and driven by a tractor having a rear axle housing, said machine having cotton picking means, forwardly extending suspension means for suspending said machine at various heights relative to the ground being traversed, said suspension means including an arched rearwardly diverging yoke having laterally spaced rear ends pivotally attached to said machine and a front end adapted to be pivotally attached to said axle housing and adjusting means for varying the height of said rear ends relative to said front end, said adjusting means including an elongated support extending rearwardly and upwardly with the upper end connected to said yoke between the front and rear ends thereof and the lower end adapted to be connected to said axle housing below said front end of said yoke, said adjusting means further including means for varying the length of said support, stabilizing means operatively associated with said machine and said rear ends of said yoke for maintaining the machine in a horizontal position, said stabilizer means including a stabilizer on each side of the machine with each stabilizer having one end pivotally attached to said machine and the other end having studs which serve to secure same to the yoke adjacent one of said laterally spaced ends and yieldable lateral alignment means for maintaining the machine in a properly oriented direction relative to the intended direction of travel of the machine and permitting the machine to shift in response to misaligned stalks, said alignment means having rear ends attached to the sides of the machine and front ends adapted to be connected to said axle housing adjacent the front end of said yoke.

6. A cotton harvesting machine adapted to be suspended from, disposed rearwardly of and driven by a tractor having a rear axle housing, said machine having rotary drum cotton picking means, picked cotton doffing means, doffed cotton conveying means, drive means adapted to drive each of said means from said tractor and forwardly disposed stalk guide means defining a plant passageway, forwardly extending suspension means for suspending said machine at various heights relative to the ground being traversed, said suspension means including an arched rearwardly diverging yoke having laterally spaced rear ends pivotally attached to said machine and a front end adapted to be pivotally attached to said axle housing and adjusting means for varying the height of said rear ends relative to said front end, said adjusting means including an elongated support extending rearwardly and upwardly with the upper end connected to said yoke between the front and rear ends thereof and the lower end adapted to be connected to said axle housing below said front end of said yoke, said adjusting means further including means for varying the length of said support, stabilizing means operatively associated with said machine and said rear ends of said yoke for maintaining the machine in a horizontal position, said stabilizer means including a stabilizer on each side of the machine with each stabilizer having one end pivotally attached to said machine and the other end having studs which serve to secure same to the yoke adjacent one of said laterally spaced ends and yieldable lateral alignment means for maintaining the machine in a properly oriented direction relative to the intended direction of travel of the machine and permitting the machine to shift in response to misaligned stalks, said alignment means having rear ends attached to the sides of the machine and front ends adapted to be connected to said axle housing adjacent the front end of said yoke.

References Cited in the file of this patent

UNITED STATES PATENTS

| | | |
|---|---|---|
| 1,408,672 | Wills | Mar. 7, 1922 |
| 1,802,022 | Johnston et al. | Apr. 21, 1931 |
| 2,101,100 | Rust et al. | Dec. 7, 1937 |
| 2,214,818 | Johnston | Sept. 17, 1940 |
| 2,311,859 | Oehlex | Feb. 23, 1943 |
| 2,754,649 | Fergason | July 17, 1956 |
| 2,760,325 | Witt | Aug. 28, 1956 |